Aug. 13, 1940.  J. D. LANGDON  2,211,212
SIPHON BREAKER AND VALVE
Filed Sept. 14, 1939
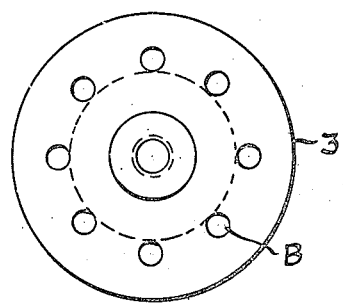
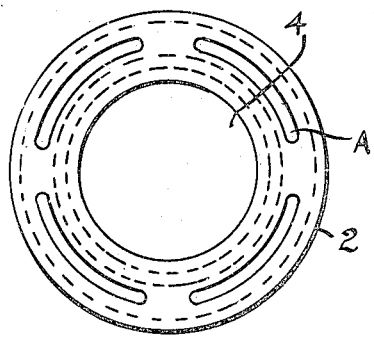
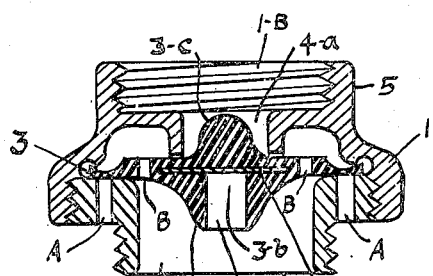
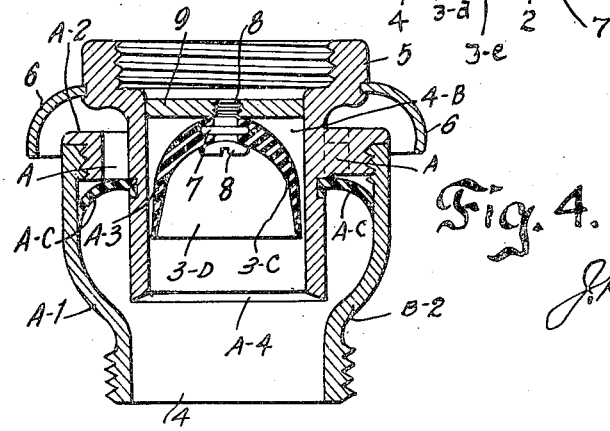
J. D. Langdon INVENTOR.

Patented Aug. 13, 1940

2,211,212

UNITED STATES PATENT OFFICE 2,211,212

SIPHON BREAKER AND VALVE

Jesse D. Langdon, Los Angeles, Calif.

Application September 14, 1939, Serial No. 294,840

3 Claims. (Cl. 277—60)

The present invention relates to anti-siphon devices particularly for use with the flush valves for toilets and the like.

The principal object of my invention is to provide a device which may be readily attached to the outlet of a flush valve or which may be built integral with the body of the same to form a siphon breaker.

Another object is to combine means at the outlet of a valve whereby a stream of liquid passing therefrom is concentrated toward the center by the provision of a shield member having a concavity in its outer side and capable of flexing to open and close the outlet of said valve.

Another object of my invention is to provide a device which will permit the entry of air into the outlet of a flush valve but which will automatically limit the ingress of air or liquid at such times as the flush valve is subjected to vacuum.

Another object is to provide means to automatically close air inlets provided for the device against the egress of liquid therefrom at such times as the flow of liquid is taking place from the outlet of the valve.

These and other objects will appear during the progress of the specification and descriptive matter.

It is specifically understood that the accompanying drawing is for the purpose of illustration only and the invention may be reduced to practice by the use of such structures as may be necessary according to the exigencies of use conforming with the structure claimed.

Of the drawing:

Fig. 1 is a sectional view of one form of the invention wherein the air ports are provided disposed toward the outlet end of the device.

Fig. 2 is a plan viewed from the top of the lower portion of the device forming the spider and air inlet 2 as of Fig. 1, showing air ports A.

Fig. 3 is a diagrammatic plan view of the main flexible valve member 3 as used in Fig. 1.

Fig. 4 is a sectional view of a preferred form of the device shown in Fig. 1 wherein the air inlets are disposed in the opposite direction from that of Fig. 1.

The structural details, specification and operation of my invention are substantially as follows:

The structure shown in Fig. 1 consists of a siphon breaker unit 1 which includes an outlet portion and spider 2 having an extended outlet port 4 which has an outside thread at the lower end thereof provided for coupling to any suitable connections of a toilet bowl. A coupling nut 5 is provided at the upper side and is enlarged to form a cap which is internally threaded to receive the flanged upper end of spider 2. A main valve closure element 3 is provided and disposed between the extension coupling nut 5 and the outer periphery of the spider 2 which is provided with intermediary air inlet ports A to allow the ingress of air at such times as vacuum may take place via the inlet of the valve to which the vacuum breaker 1 may be attached. The main valve closure element 3 is preferably provided with projection 3b having a concavity 3e the open end of which projects downwardly in line with the upwardly projecting central portion 3c formed to streamline the movement of liquid flowing from the valve outlet to which the vacuum breaker 1 is attached. This structural form acts to minimize turbulence and facilitate the flow of liquid through the water ports B provided in circumferentially disposed order, said ports disposed radially outwardly of and beyond the circumference of a port 4a provided through the center of coupling nut 5.

The operation of the vacuum breaker as of Fig. 1 involves the coupling of the same to the outlet end of a flush valve or similar device with which it is to be used. When the flow of liquid starts the member 3 is forced downwardly away from the port 4a and liquid then flows through the ports B downwardly through outlet 4, at the same time the portion of member 3 disposed immediately next to and radially outward of ports B is forced downwardly across said ports B. The stream concentrator 3d is provided by the extended portion having a recess 3e disposed upwardly and partly through the valve closure element 3. The velocity of liquid flowing downwardly around the edge of recess 3e creates a partial vacuum at the center of the outflowing stream thus drawing and concentrating the column of liquid into a solid stream below the end of the extension 3d at such times as liquid is flowing through ports B.

Fig. 4 is the preferred form and has substantially the same structure as Fig. 1 insofar as operation is concerned. The equivalent parts bear the same numerals and characters appended indicate modifications and departures from the original forms. The elements performing similar functions to those of Fig. 1 consist of a member A3 the top portion of which is the equivalent of 3c as of Fig. 1. The portion A3 as of Fig. 4 consists of a separate bell-shaped member molded of rubber and having a metal reenforcing washer 7 molded into the material, the whole being held in operative position by a screw 8 which is shouldered and threaded into a supporting member 9 disposed transversely of the upper end of port 4B in position to permit the member A3 to have its lower edge near the inner marginal lower edge of extended outlet A4 and preferably very slightly clearing inside the lower inner surface of the port 4B. The spider A2 in this instance is located at the lower end of the coupling nut 5 and extends radially outward therefrom being threaded to enter the body B2. A cowl ring 6 is provided to extend radially outward from the coupling nut 5 and cover ports A of spider A2 to which it is assembled into a shallow groove surrounding the coupling nut 5. A hole provided through the center of the cowl ring 6 is of slightly smaller diameter than that of the bottom of groove in the coupling nut 5 so that when the cowl ring 6 is forced downwardly over the coupling nut 5 the metal of the cowl ring 6 is sufficiently sprung to allow it to snap snugly into the groove around nut 5 provided for that purpose.

The operation of the modified form of the siphon breaker unit as of Fig. 4 is substantially the same as that of Fig. 1 except that liquid passing downwardly through the port 4b acts to compress and collapse the separate member A3 which performs the same function as the central portion 3d of the single member 3 of Fig. 1. The concavity inside of the bell-shaped member A3 acts to concentrate flowing liquid toward the center and reduce the turbulence of water passing through the siphon-breaker unit. The rubber check valve member Ac is circumferentially disposed and retained in a groove surrounding a downwardly extended portion of the wall of port 4b so that in case a back pressure of liquid occurs inside the body B2 no leakage will occur through ports A. When a vacuum is created within the valve or within the body B2 to which the vacuum breaker unit A1 is attached then the lower outer circumference of the member A3 is expanded toward the lower inner circumference of the wall of the port 4B, thus sealing same against the ingress of fluid by suction or aspiration. In case any vacuum is created within the body portion B2 atmospheric pressure is allowed to enter by forcing the member 4c downwardly and collapsing the same radially inwardly. Ordinarily the member A3 is made with its outer diameter slightly smaller than the inner diameter of the outlet extension A4, so that a slight amount of air may bypass when vacuum is exerted from the inlet side in order to gradually break any vacuum formed. The member A—C is ordinarily made of very flexible rubber barely touching the inner circumference of the air inlet tube B2 so that no appreciable amount of vacuum is required to free the passages formed by air inlets A—A.

It will be noted that the various species of the invention represented by the different figures all involve the use of elements having substantially the same placement and constituting various mechanical organizations to bring about the same results in every instance. The similarly numbered varous parts of all the figures serve substantially the same functions as those illustrated by the other figures.

Having described my invention and illustrated various adaptations to practice to aid those versed in the art to build and use the same, I claim:

1. In a siphon breaker unit, a combination comprising a casing having an inlet and an outlet, air vent means disposed through said casing and communicating with the atmosphere, groove means supporting an annular valve closure element of flexible material registering with said air vent means, a valve closure element of flexible material supported in operative position and registering with said inlet and held centrally disposed by means provided with apertures to permit the passage of liquid through said casing, said annular valve element capable of being flexed outward to close said air vent means in unison with the flexing and opening of the second named valve closure element when liquid is passing through said siphon breaker unit, the first valve closure element flexing to close said inlet when vacuum is exerted from the inlet side of said casing, said second valve closure element forming a structure having a recess disposed with its open end facing toward said outlet and of sufficient extent that turbulence of liquid passing through said apertures is reduced and the stream of liquid passing toward the outlet is converged axially after passing said second valve closure element.

2. A siphon breaker unit as of claim 1, wherein the casing is provided with an inwardly projecting tubular portion extending into the casing and spaced from the wall thereof, said first valve element being disposed in said space and said second valve element being disposed in the tubular portion.

3. A siphon breaker unit as of claim 1, wherein the casing is provided with an inwardly projecting tubular portion extending into the casing and spaced from the wall thereof, means to attach said valve elements together, said means together with said valve elements forming liquid conducting means.

JESSE D. LANGDON.